UNITED STATES PATENT OFFICE.

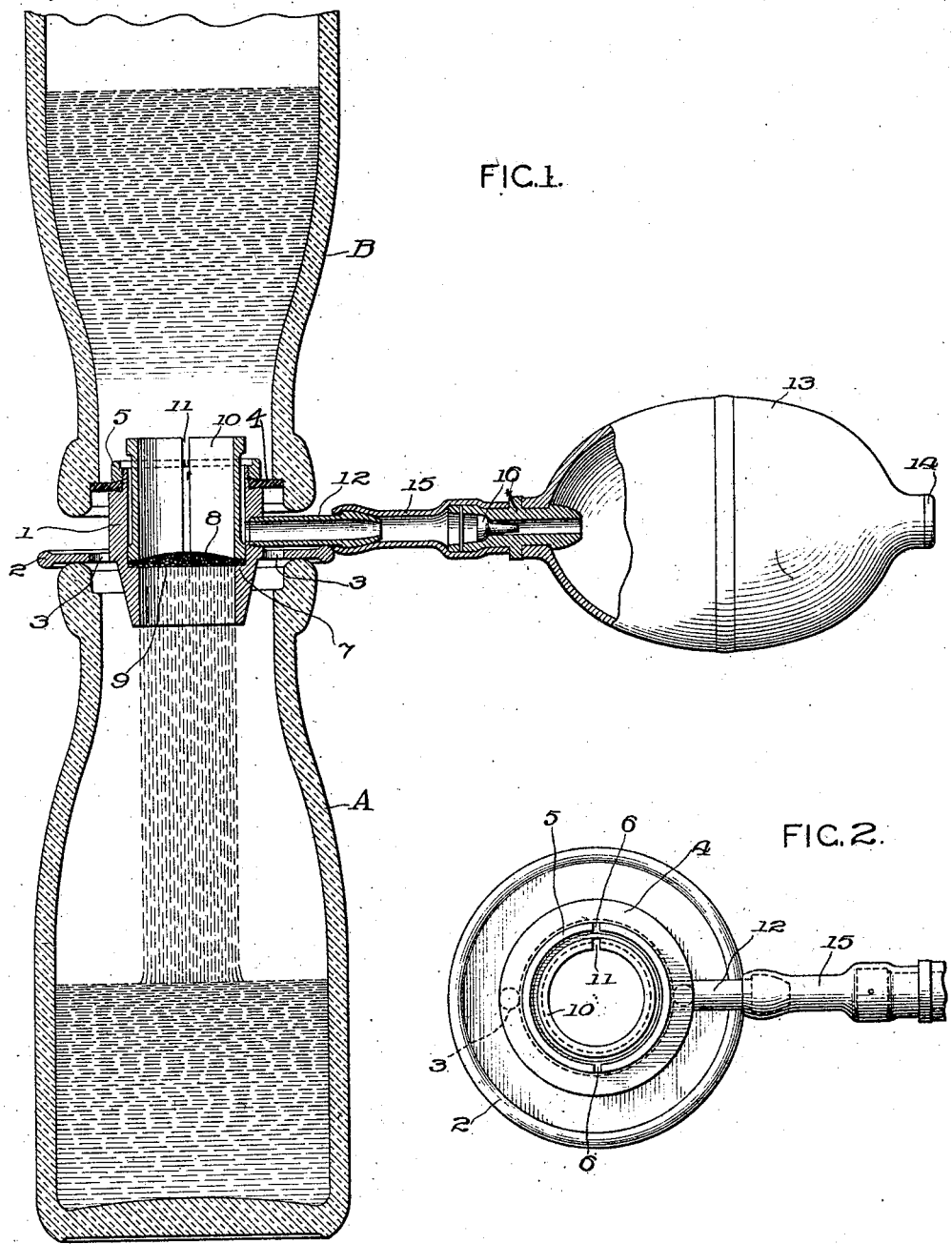

THEODORE L. VALERIUS AND OLAF LARSEN, OF FORT ATKINSON, WISCONSIN, ASSIGNORS TO CREAMERY PACKAGE MANUFACTURING COMPANY, A CORPORATION OF ILLINOIS.

SEDIMENT-TESTER.

1,052,391. Specification of Letters Patent. Patented Feb. 4, 1913.

Application filed August 23, 1912. Serial No. 716,602.

*To all whom it may concern:*

Be it known that we, THEODORE L. VALERIUS and OLAF LARSEN, citizens of the United States, residing at Fort Atkinson, in the county of Jefferson and State of Wisconsin, have invented certain new and useful Improvements in Sediment-Testers, of which the following is a specification.

This invention relates to means for determining the amount of sediment or solid impurities in milk.

One of the objects of this invention is to produce a simple, conveniently-operable, and compact sediment-tester which is structurally independent of the container for the milk to be tested, and which shall be adapted for use with any convenient container, such as an ordinary milk bottle.

Another object of the invention is to provide a construction which shall readily lend itself to the production by milk dealers, hotels and other purchasers of milk, of records showing the quantity of sediment contained in the milk received by them.

In the accompanying drawing, Figure 1 is a sectional view illustrating a sediment tester embodying our invention, and showing the manner in which it may be used. Fig. 2 is a fragmental top plan view of the tester.

The embodiment herein shown of our invention is adapted to be supported upon the mouth of a milk bottle A and to support in inverted position a bottle B containing the milk to be tested.

In the form illustrated in the drawings, the tester comprises a tubular body 1 having an annular outwardly-extending flange 2 adapted to rest upon the mouth of the bottle A. In the flange 2 is a suitable number of vent openings 3 forming an outlet for the air displaced from the receiving bottle A by the incoming filtered milk. Near the upper end of the body 1 is an annular outwardly-extending flange 4 to support the bottle B. Herein we have shown the flange 4 as consisting of a rubber ring adapted to lie in contact with the seat provided for the ordinary milk-bottle cap, said ring being secured in place by means of a nut 5.

6 are notches in the nut 5 to receive a spanner wrench. If desired, the surfaces of the body 1 and the nut 5 which are in contact with the rubber flange 4 may be beveled, as herein shown, so as to hold said flange tightly in place. The rubber flange or gasket 4 forms a liquid-tight joint with the mouth of the bottle B.

The body 1 is provided with an interior annular shoulder 7 adapted to support a filter disk 8 of any suitable character and a disk 9 of wire netting or other suitable material. Said disks may be removably held in place by any appropriate means, as, for example, a sleeve 10 arranged to rest upon the edges of the filter disk, and of such length as to project above the body 1 in order that said sleeve may be conveniently lifted out of its place and returned thereto. The sleeve 10 is frictionally held in place in the body 1, said sleeve being preferably made slightly resilient, as by forming a slot 11 through one side.

Air is admitted to the upper bottle to counterbalance the atmospheric pressure, and thus permit the milk to flow by gravity into the lower bottle. Herein we have shown an air inlet tube 12 connected to the body 1 and communicating with the interior of said body; the periphery of the sleeve 10 being recessed to provide an annular space between said sleeve and said body for the upward passage of air. A rubber bulb 13 having the usual air inlet 14 is connected to the outer end of the inlet tube 12 by means of a flexible tube 15. In the neck of the bulb 13 is located the usual check valve 16.

The apparatus may be used for testing either bulk or bottled milk. In practice, the tester is placed upon the mouth of a bottle containing milk to be tested, the rubber flange 4 being in contact with the cap seat. The bottle and tester are then inverted and placed on the mouth of an empty milk bottle or other suitable container. Air may now be forced into the upper bottle, whereupon the milk will flow through the sleeve 10 and through the filter disk 8 and the screen 9 into the lower bottle. The air displaced from the lower bottle by the incoming filtered milk escapes through the vent opening 3. When the sample of milk has been thus filtered, the bottle B is removed, the sleeve 10 withdrawn from the body 1 and the filter disk 8 removed. The filter disk may be readily removed by pressing upwardly on the wire screen or disk 9, thereby pushing both disks up out of the body 1. After the filter disk has been inspected it may, if desired, be dried and mounted upon a record card to be preserved by the user or forwarded to the dairyman who supplied the milk.

It will be seen that the tester is simple and self-contained, that no special milk receptacle need be provided, and that the device may be readily taken apart when cleaning is required.

We claim as our invention:

1. A sediment tester comprising a hollow body adapted to rest upon a receptacle and to support a container, and a filtering element carried by said body, said body having an air inlet therethrough above said element.

2. As an article of manufacture, a sediment-tester comprising a body, a filtering element carried by the body, and air-injecting means attached to the body.

3. As an article of manufacture, a sediment-tester comprising a chambered body, a filtering element within the body, an air inlet tube connected to the body and communicating with the interior thereof, and air-injecting means connected to said tube.

4. A sediment tester comprising a tubular body adapted to be supported upon the mouth of a milk bottle, said body having interior filter-supporting means, a filter disk resting upon said supporting means, a tubular element adapted to rest upon the edges of said filter disk and engaging said body to prevent displacement of said disk, a space being provided between said body and said tubular element, and said body having an air inlet opening into said space.

5. A sediment tester comprising a tubular body having an outwardly extending flange adapted to rest upon the mouth of a milk bottle, a rubber gasket encircling the upper portion of said body and adapted to fit into the cap seat of an inverted milk bottle and support such inverted milk bottle, means for securing said gasket to the body, said body having an internal annular shoulder, a screen resting upon said shoulder, a filtering disk resting upon said screen, a sleeve having one end resting upon the edges of said filtering disk, a space being provided between the periphery of said sleeve and the interior wall of said body, said sleeve extending above the body, and said body having an air inlet therethrough communicating with said space.

6. A sediment-tester comprising a tubular body adapted to be supported upon the mouth of a milk bottle, said body having interior filter-supporting means, a filter disk resting upon said supporting means, a tubular element adapted to rest upon the edges of said filter disk and engaging said body to prevent displacement of said disk, a space being provided between said body and said tubular element, and air-injecting means attached to said body and communicating with said space.

7. A sediment-tester comprising a body provided with outwardly-extending means adapted to rest upon the mouth of a milk bottle, a rubber ring encircling the upper portion of said body, means for securing said ring to the body, and a filtering element carried by said body.

8. A sediment-tester comprising a tubular body having an outwardly-extending flange adapted to rest upon the mouth of a milk bottle, an air vent opening being provided in said flange, a rubber gasket encircling the upper portion of said body and adapted to fit into the cap seat of an inverted milk bottle and support such inverted bottle, means for securing said gasket to the body, said body having an internal annular shoulder, a screen resting upon said shoulder, a filtering disk resting upon said screen, a sleeve having one end resting upon the edges of said filtering disk, a space being provided between the periphery of said sleeve and the interior wall of said body, said sleeve extending above the body, an air inlet tube adapted to be attached to said body and communicating with said space, and a rubber bulb connected to said air inlet tube.

In testimony whereof we affix our signatures in the presence of two witnesses.

THEODORE L. VALERIUS.
OLAF LARSEN.

Witnesses:
JOSEPH A. DIETZ,
L. A. FORSYTH.